(12) United States Patent
Breusa et al.

(10) Patent No.: US 11,761,539 B2
(45) Date of Patent: Sep. 19, 2023

(54) SEAL ASSEMBLY FOR A VEHICLE MOTORIZED WHEEL

(71) Applicant: FREUDENBERG SEALING TECHNOLOGIES S.A.S. DI EXTERNA ITALIA S.R.L.U., Pinerolo (IT)

(72) Inventors: Luca Breusa, Pinerolo (IT); Giorgio Cucco, Pinerolo (IT); Pasquale Angiulli, Pinerolo (IT)

(73) Assignee: FREUDENBERG SEALING TECHNOLOGIES S.A.S. DI EXTERNA ITALIA S.R.L.U.

( * ) Notice: Subject to any disclaimer, the term of this patent is extended or adjusted under 35 U.S.C. 154(b) by 0 days.

(21) Appl. No.: 17/679,321

(22) Filed: Feb. 24, 2022

(65) Prior Publication Data
US 2022/0275864 A1 Sep. 1, 2022

(30) Foreign Application Priority Data
Feb. 26, 2021 (IT) .................. 102021000004538

(51) Int. Cl.
*F16J 15/3232* (2016.01)
*F16J 15/3256* (2016.01)
(Continued)

(52) U.S. Cl.
CPC ....... *F16J 15/3232* (2013.01); *F16J 15/3256* (2013.01); *F16J 15/3264* (2013.01); *F16C 33/7823* (2013.01); *F16C 33/7883* (2013.01)

(58) Field of Classification Search
CPC .. F16J 15/3232; F16J 15/3252; F16J 15/3256; F16J 15/3264; F16C 33/7823;
(Continued)

(56) References Cited

U.S. PATENT DOCUMENTS 4,484,752 A * 11/1984 Bentley ............... F16J 15/3264
277/377
4,958,942 A * 9/1990 Shimizu ............ F16C 33/7869
277/368

(Continued)

FOREIGN PATENT DOCUMENTS

EP 1890057 A1 2/2008
EP 2913565 A1 9/2015

*Primary Examiner* — Nicholas L Foster
(74) *Attorney, Agent, or Firm* — The Belles Group, P.C.

(57) ABSTRACT

A seal assembly configured to prevent/limit the entry of external contaminants into a motor compartment of a motorized wheel for vehicles is described. The seal assembly comprises a first support ring which is fixed, a second support ring which is rotatable and radially outermost of the first support ring, and an annular seal interposed between the support rings and including an anchor portion, attached to the second support ring and at least a first and a second annular sealing lip, protruding cantilevered from the anchor portion, mounted by interference between the support rings, defining a sealing configuration, wherein they cooperate with distinct portions of the first support ring along respective annular contact lines, and set by centrifugal effect in a detaching configuration from the respective portions of the first support ring at speeds of the motorized wheel greater than a predetermined non-zero value.

11 Claims, 4 Drawing Sheets

(51) Int. Cl.
*F16J 15/3264* (2016.01)
*F16C 33/78* (2006.01)

(58) Field of Classification Search
CPC .............. F16C 33/7873; F16C 33/7876; F16C 33/7879; F16C 33/7883
See application file for complete search history.

(56) References Cited

U.S. PATENT DOCUMENTS

| | | | | |
|---|---|---|---|---|
| 5,975,534 | A * | 11/1999 | Tajima | F16J 15/3264 277/572 |
| 6,206,380 | B1 * | 3/2001 | Miyazaki | F16C 33/7883 277/560 |
| 6,550,973 | B2 * | 4/2003 | Yeo | F16C 33/7883 384/484 |
| 6,637,754 | B1 * | 10/2003 | Ohtsuki | F16C 33/64 277/549 |
| 6,979,001 | B2 * | 12/2005 | Ohtsuki | F16J 15/3264 277/572 |
| 2004/0086212 | A1 * | 5/2004 | Ohtsuki | F16J 15/326 384/448 |
| 2009/0127797 | A1 * | 5/2009 | Kanzaki | F16J 15/3264 277/565 |
| 2010/0025938 | A1 * | 2/2010 | Berdichevsky | F16J 15/3264 277/562 |
| 2021/0362585 | A1 * | 11/2021 | Yada | H02K 21/22 |
| 2023/0003257 | A1 * | 1/2023 | Huelz | F16C 33/7879 |

\* cited by examiner

SEAL ASSEMBLY FOR A VEHICLE MOTORIZED WHEEL

CROSS-REFERENCE TO RELATED APPLICATIONS

This patent application claims priority from Italian Patent Application No. 102021000004538 filed on Feb. 26, 2021, the entire disclosure of which is incorporated herein by reference in its entirety.

TECHNICAL FIELD

The present invention relates to a seal assembly configured to prevent/limit the entry of external contaminants into a motor compartment of a vehicle motorized wheel.

BACKGROUND ART

In recent years, developments in electric drive systems have made it possible to propose electric motors that can be directly integrated into the wheels of on-road or off-road vehicles. Such motors, commonly known as in-wheel electric motors generally comprise a stator, for example consisting of a plurality of coils and attached to a vehicle chassis, and a rotor, for example consisting of a series of magnets arranged around the stator and attached to the rotor part of the motorized wheel.

These motors may be, for example, of the electromagnetic induction, permanent magnet, synchronous ring, switched reluctance, etc. type.

A problem associated with the use of motors integrated into vehicle wheels is limiting/preventing the entry of external contaminants into the wheel compartments housing the aforesaid motors. Such a problem can be solved by adopting suitable seal assemblies that can provide a barrier to the possible penetration of external contaminants, such as splashes, mud, water, into the in-wheel electric motors.

Another problem is to make seal assemblies that can ensure a long service life and do not cause excessive friction and consequent dissipation of the power generated by the in-wheel electric motors.

A seal assembly is known from Patent EP-B1-2058563 to the same Applicant that is configured to be housed in the compartment defined between a hollow casing and a rotating member, such as a shaft of a vehicle coaxially housed in the casing. This seal assembly is used between two environments, one of which is intended to accommodate a lubricating oil bath, and the other where oil must be prevented from entering and which is intended to accommodate air.

The seal assembly shown in Patent EP-B-2058563 essentially comprises a first support ring made of a rigid material that can be attached to the casing, a second support ring made of a rigid material, arranged radially innermost with respect to the first support ring and coupled to the rotating member to rotate in use together with the latter, and an annular gasket made of elastically deformable material, interposed between the first and the second support ring and comprising an anchor portion, carried by the first fixed support ring, and a first and a second annular sealing lip, protruding cantilevered from the anchor portion and cooperating in use respectively with a radial portion and with an axial portion of the second rotatable support ring.

In particular, the first sealing lip is configured to generate, with its own free end portion, a constant diffuse contact, i.e., in any conditions of use, over a large area of the radial portion of the second rotating support ring. More precisely, the aforesaid free end portion of the first sealing lip has a spiral groove configured to generate, during the rotation of the rotating member, a fluid-dynamic pumping action aimed at moving the oil away from the sealing area and towards the oil bath environment. The fluid-dynamic pumping action is achieved by generating a flow of air from the air environment to the oil-containing environment via the groove in the first sealing lip and by the rotation of the rotating member.

The second sealing lip is available in an oil-tight contact configuration with the axial portion of the second support ring when the rotating member is stationary, and can be detached from said axial portion due to the fluid-dynamic pumping effect generated by the groove of the first sealing lip on the air inside the groove when the rotating member is rotating.

The known described solution, although functionally effective in separating two environments from one another, one containing air and the other containing oil, of a casing housing a rotating member, is not suitable for the new requirement and in particular does not solve any of the problems indicated above in relation to the design of a seal assembly for a vehicle motorized wheel.

DISCLOSURE OF INVENTION

Aim of the present invention is therefore to make a seal assembly configured to prevent/limit the entry of external contaminants into a motor compartment of a vehicle motorized wheel, which enables the above-specified problems to be overcome in a simple and cost-effective manner.

The aforesaid aim is achieved by the present invention, in that it relates to a seal assembly configured to prevent/limit the entry of external contaminants into a motor compartment of a vehicle motorized wheel, as defined in claim 1 and dependent claims thereof.

BRIEF DESCRIPTION OF THE DRAWINGS

In order to better understand the present invention a preferred embodiment is described hereinafter, by way of a non-limiting example with reference to the accompanying drawings, wherein.

DETAILED DESCRIPTION

Figure 1:
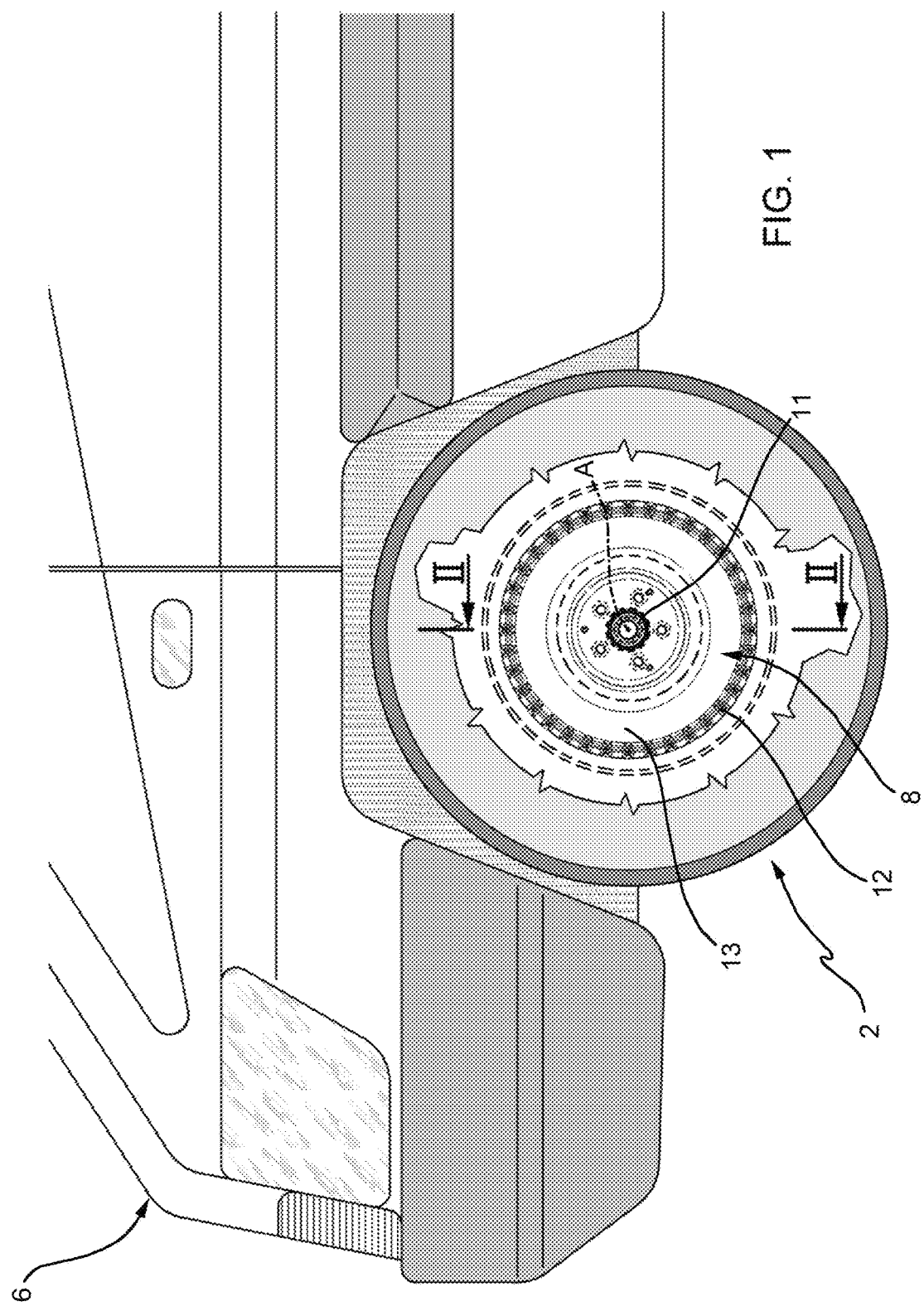
FIG. 1 shows, in a side view and with parts removed for clarity, a portion of a vehicle having a motorized wheel provided with an internal electric motor.
Figure 2:
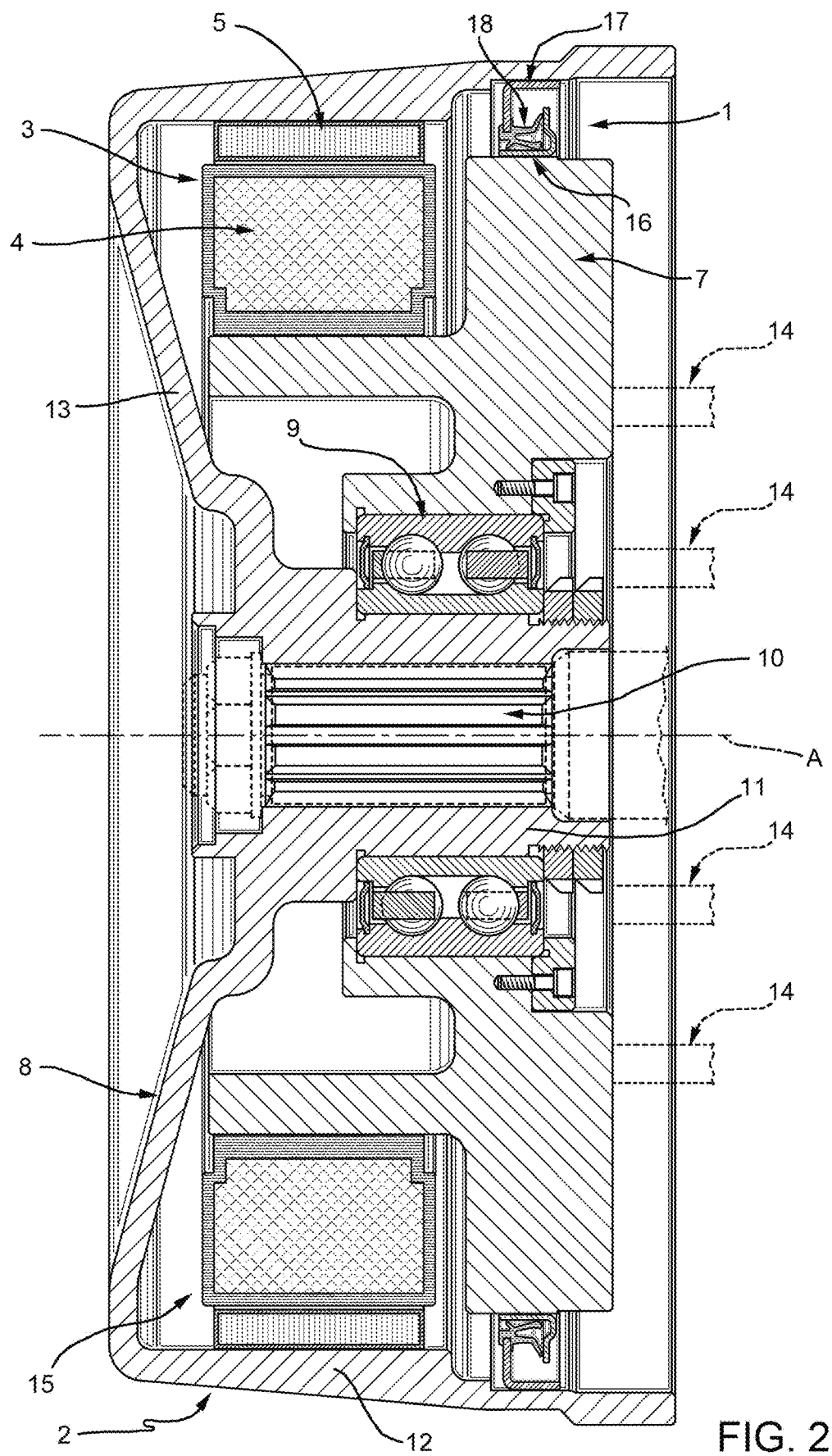
FIG. 2 is an enlarged scale section of the motorized wheel of FIG. 1 according to line II-II of the same figure.

Referring to FIGS. 1 and 2, 1 denotes as a whole a seal assembly configured to limit/prevent the entry of external contaminants into a motorized wheel 2 housing an inner electric motor 3, commonly known as an in-wheel electric motor, for example an electromagnetic induction motor, a permanent magnet motor, a synchronous ring motor, a switched reluctance motor, etc., i.e. a motor having a stator 4 and a rotor 5.

The motorized wheel 2 may be used on any type of vehicle, in particular on a motor vehicle or on other types of on-road or off-road vehicles, an example of which is shown in FIG. 1 and is collectively denoted by 6.

In particular, the motorized wheel 2 has an axis A and comprises a stator portion 7, fixed to the vehicle chassis 6 by means of connecting elements 14 (illustrated schematically in FIG. 2 in a dotted line) and therefore fixed, and a rotor portion 8, supported in a rotatable manner around the axis A by the stator portion 7 by means of one or more bearings 9.

In the case shown, the stator portion 7 has an annular shape defining a through hole 10 of axis A intended to receive, with the interposition of the bearing 9, a hub 11 of the rotor portion 8.

More particularly, the rotor part 8 comprises, in addition to the hub 11, an annular crown 12 and a disc-shaped wall 13 connecting the respective corresponding axial ends of the hub 11 and the crown 12.

As visible in FIG. 2, the stator portion 7 of the motorized wheel 2 is mounted in the annular space enclosed between the hub 11 and the crown 12 in a position facing the disc-shaped wall 13.

The stator portion 7 delimits with the crown 12 and with a portion of the disc-shaped wall 13 adjacent to the crown 12 itself an annular compartment 15, wherein the electric motor 3 is housed in use. In more detail, the rotor 5 of the electric motor 3 is cantilevered by the crown 12 of the rotor portion 8 of the motorized wheel 2; the stator 4 of the electric motor 3 is instead carried by the stator part 7 in a radial position facing the rotor 5.

Between the radially outer peripheral edge of the stator portion 7 and the crown 12 the seal assembly 1 according to the present invention is interposed to prevent/limit the entry into the compartment 15 of external contaminants (e.g., water, splashes, dust, pollutants, etc.) that could damage or impair the operation of the electric motor 3 during the vehicle operation 6.

Figure 3:
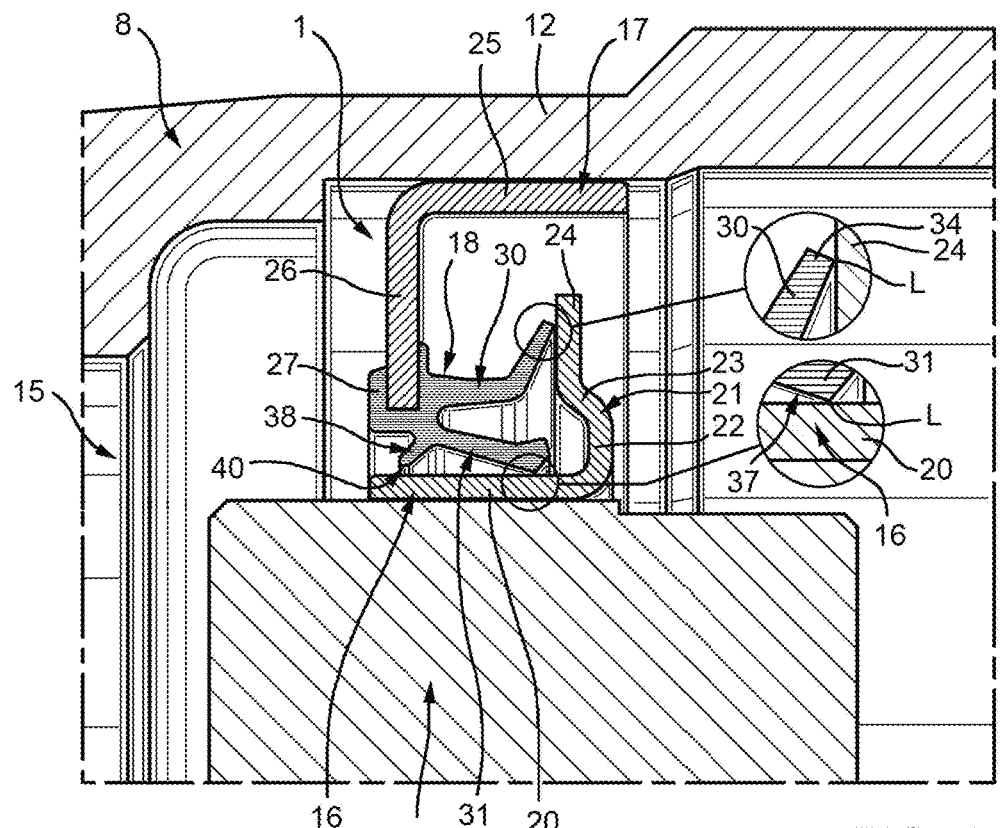
FIG. 3 is an enlarged scale axial semi-section of a seal assembly according to the present invention configured to prevent/limit the entry of external contaminants into the motorized wheel compartment of FIGS. 1 and 2 housing the electric motor.
Figure 4:
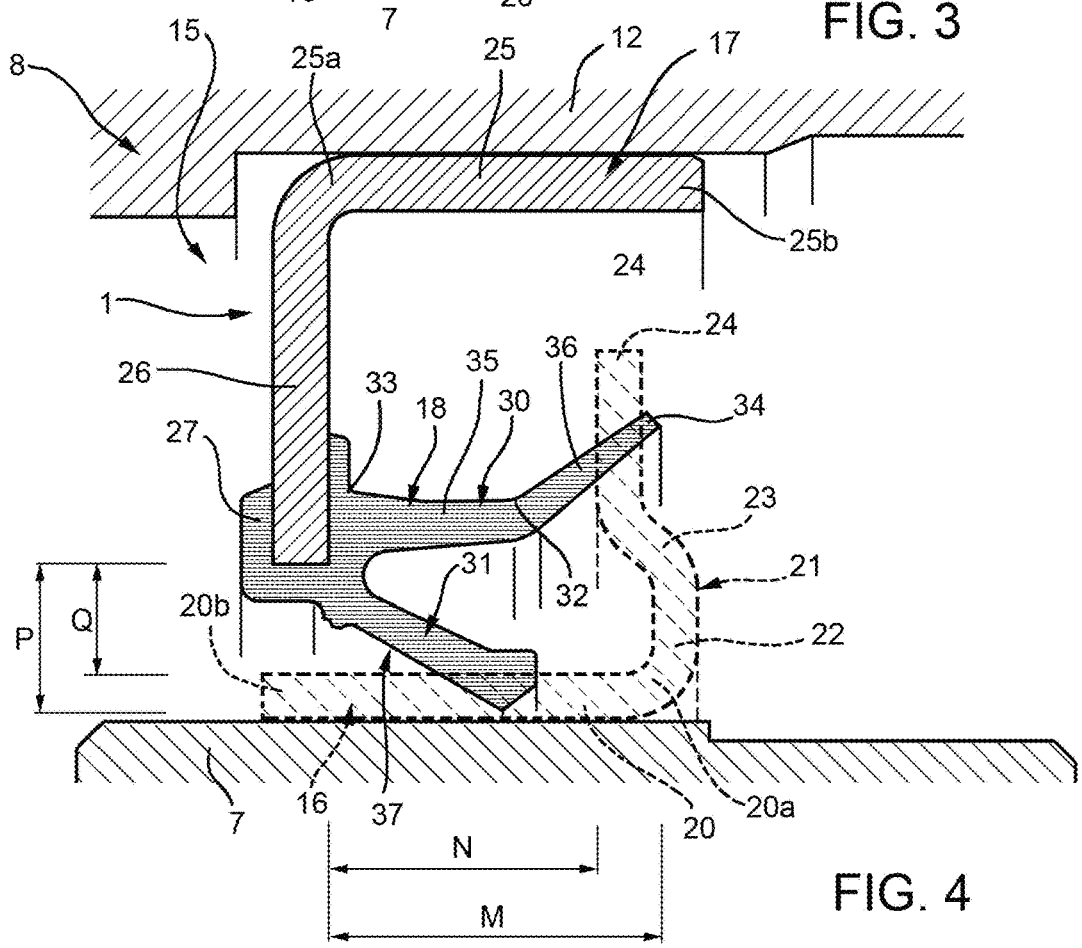
FIG. 4 is a Figure similar to FIG. 3, on a further enlarged scale, showing a gasket of the seal assembly according to the invention in an undeformed condition prior to assembly.
Figure 5:
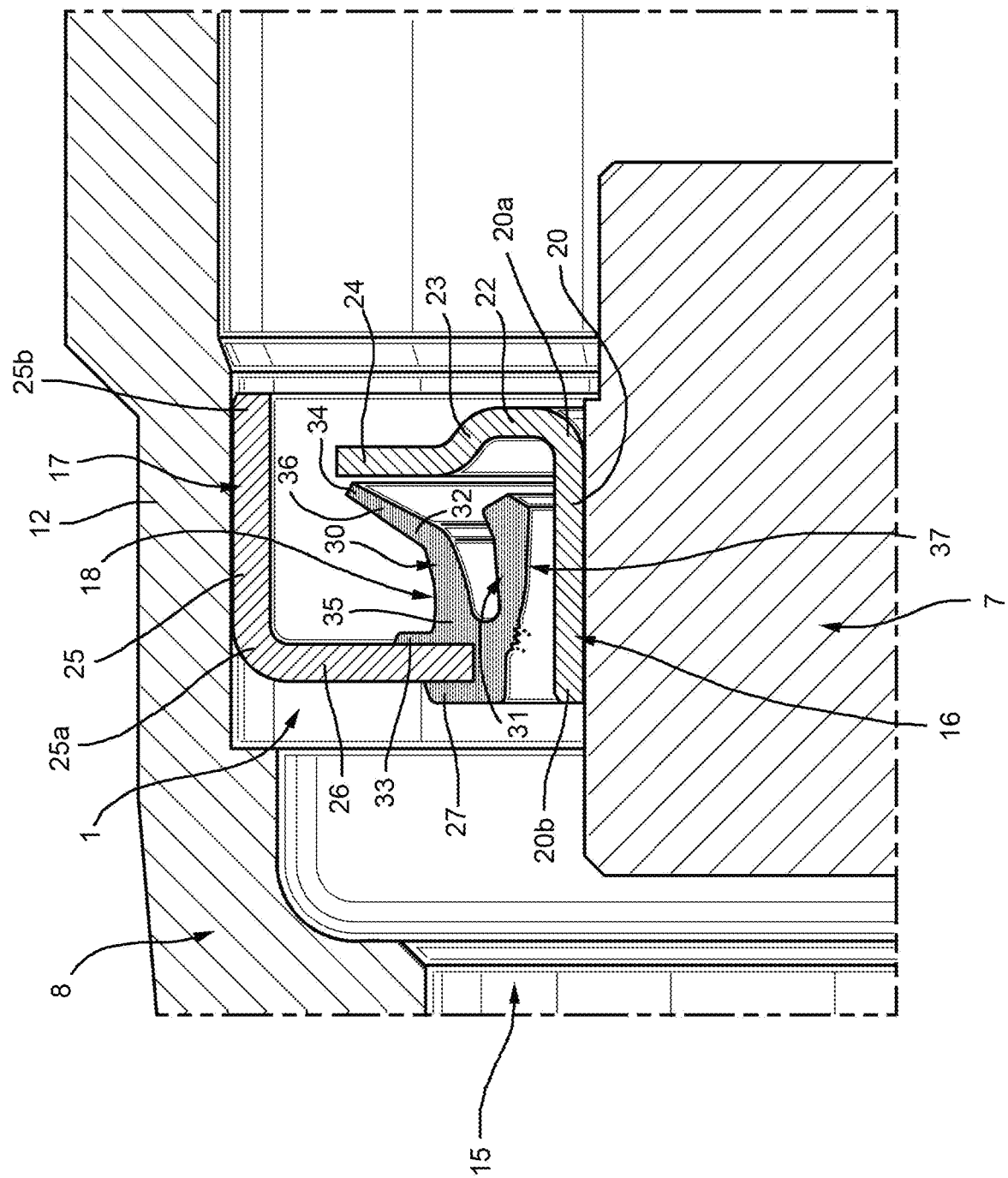
FIG. 5 is a Figure similar to FIG. 3, showing the seal assembly according to the invention in a different operating condition.

With reference to FIGS. 3 to 5, the seal assembly 1 has an axis coincident in use with the axis A of the motorized wheel 2 on which it is mounted and comprises: a first radially inner support ring 16 made of a rigid material fixed in use to the radially outer peripheral edge of the stator portion 7 of the motorized wheel 2; a second radially outer support ring 17, made of a rigid material, rotatable in use about the axis A with respect to the support ring 16 and jointly with the rotor portion 8 of the driven wheel 2; and an annular gasket 18 made of an elastically deformable material, interposed between the support rings 16 and 17 and preferably consisting of a single element.

The support ring 16 comprises an axial portion 20, extending parallel to the axis A and fixed in use to the radially outer peripheral edge of the stator portion 7 of the motorized wheel 2, and an approximately radial shaped portion 21, which extends cantilevered from an end 20*a* of the axial portion 20 opposite to the end 20*b* facing the compartment 15.

In particular, the shaped portion 21 comprises, starting from the axial portion 20, a first radial portion 22 connected to the end 20*a*, a conical portion 23 having sections increasing towards the compartment 15, and a second radial portion 24, arranged in an axial position offset towards the compartment 15 with respect to the radial portion 21.

The radial portion 24 defines the free end part of the shaped portion 21 and is connected to the radial portion 22 by the conical portion 23.

Similarly to the support ring 16, the support ring 17 comprises an axial portion 25, extending parallel to the axis A in a position facing the axial portion 20 of the support ring 16 and fixed in use to the radially inner surface of the crown 8 of the rotor part 7 of the motorized wheel 2, and a radial portion 26, extending radially cantilevered from the axial portion 25 in a position facing the shaped portion 21 and towards the axial portion 20 of the support ring 16 itself.

In more detail, the axial portion 25 has opposite ends 25*a* and 25*b*, the first of which is adjacent to the compartment 15. The radial portion 26 extends cantilevered from the end 25*a* towards the end 20*b* of the axial portion 20 and delimiting with the latter a predefined radial gap. The radial portion 26 is connected to the end 25*a* of the axial portion 25.

In practice, the shaped portion 21 of the support ring 16, and therefore the radial portions 22 and 24, as well as the radial portion 26 of the support ring 17 are arranged in a position interposed between the axial portions 20 and 25.

Furthermore, the axial portion 25 of the support ring 17 is radially disposed outermost of the axial portion 20 of the support ring 16.

Advantageously, the gasket 18 comprises an anchor portion 27, externally attached to a free end section of the radial portion 26 of the support ring 17, and at least one first and one second annular sealing lip 30, 31, projecting cantilevered from the anchor portion 27, mounted by interference between the support rings 16, 17 and defining a sealing configuration (FIG. 3), wherein they cooperate in contact with the radial portion 24 and with the axial portion 20, respectively, of the support ring 16 along respective annular contact lines L so as to be elastically preloaded, without the aid of external actions or external components, against the support ring 16 itself; the sealing lips 30, 31 are, moreover, set by centrifugal effect in a detaching configuration (FIG. 5) from the radial portion 24 and from the axial portion 20 of the support ring 16, respectively, at speeds of the motorized wheel 2 greater than a predetermined non-zero value V, for example, in the case shown, between 800 rpm and 1,000 rpm.

The speed value V of the motorized wheel 2 at which the elastic preload of the sealing lips 30, 31 on the support ring 16 is cancelled depends on: diameter of the seal assembly 1; level of protection required, which in turn depends on the type of vehicle 6; speed ranges considered; dimensional preload of the sealing lips 30, 31, which in turn depends on the dimensional interferences of the sealing lips 30, 31 themselves in undeformed conditions with the support rings 16, 17; length of the sealing lips 30, 31; thickness of the sealing lips 30, 31.

The sealing lip 30 has an intermediate fold 32 between its own end 33 connected to the anchor portion 27 and its own opposite end 34 cooperating in contact in use with the radial portion 26 of the support ring 16 in the sealing configuration.

More specifically, the sealing lip 30 comprises a base portion 35, extending between the end 33, connected to the anchor portion 27, and the fold 32, and an oblique portion 36 extending between the fold 32 itself and the free end 34; the oblique portion 36 of the sealing lip 30 forms an acute angle with the radial portion 24 of the support ring 16 on the side facing the axial portion 20.

The base portion 35 of the sealing lip 30 has a substantially parallel course with the axis A. The base portion 35 of the sealing lip 30 also has a tapered section towards its free end 34. The sealing lip 31 extends from the anchor portion 27 of the gasket 18, in a position radially interposed between the sealing lip 30 and the axial portion 20 of the support ring 16 and is bounded, on the side facing the axial portion 20 itself, by a truncated conical surface 37 with respect to the axis A, having diameters decreasing towards the shaped portion 21 of the support ring 16.

As visible in FIG. 4, the sealing lip 30 has, in its own undeformed configuration and prior to assembly in the seal assembly 1, an overall axial length M, starting from the anchor portion 27, between 110% and 130% of the axial distance N between the radial portions 24 and 26 of the support rings 16, 17 in their assembly condition to form the seal assembly 1 itself.

The sealing lip 31 has, in its own undeformed configuration and prior to assembly in the sealing assembly 1, an overall radial length P, from the anchor portion 27, between 110% and 130% of the radial distance Q between the free end section of the radial portion 26 of the support ring 17 and the axial portion 20 of the support ring 16 in the assembly condition of the seal assembly 1 itself.

It must be specified that, in the calculation of the axial lengths M and radial lengths P of the sealing lips 30, 31 in undeformed conditions, the anchor portion sections 27 (of practically negligible size) from which said sealing lips 30, 31 extend directly and which are included between the sealing lips 30, 31 themselves and the respective adjacent sections of the support ring 16 are considered included in the calculated lengths.

Assembling by interference the sealing lips 30, 31 defines the elastic preload of the sealing lips 30, 31 in the static sealing configuration.

Finally, the gasket 18 comprises a further annular, truncated conical lip 38 of axis A, which has a conicity opposite to that of the sealing lip 31 and extends towards the axial portion 20 of the support ring 16 from the anchor portion 27.

The lip 38 extends axially from the opposite side of the sealing lip 31 with respect to the shaped portion 21 of the support ring 16. The lip 38 delimits with the axial portion 20 of the support ring 16 an annular opening 40 having such a small size as to allow, in any condition, the passage of air while defining a stop for any particulate impurities.

In use, in the stop condition of the vehicle 6, i.e., when the motorized wheel 2 is stationary, both sealing lips 30, 31 are elastically loaded against the radial 26 and axial 25 portions of the support ring 16 in the sealing configuration.

Even at low speeds of the motorized wheel 2, in the case shown, lower than the value V, for example in the condition wherein the vehicle 6 travels at around 30-50 km/h, the sealing lips 30, 31 continue to cooperate in contact with the support ring 16 preventing the entry of any external contaminants into the compartment 15. In this case, the elastic load of the sealing lips 30, 31 on the support ring 16 progressively reduces as the speed increases due to the centrifugal effect; in fact, precisely because of the increasing speed, the sealing lips 30, 31 tend to move away from the radial 26 and axial 25 portions of the support ring 16 due to the centrifugal effect.

In this speed range of the motorized wheel 2, i.e., lower than the V value and typically used in fords, static water floods and/or off-road, the protection offered by the seal assembly 1 is therefore optimal.

As the speed of the motorized wheel increases beyond the predetermined value V, i.e., when the vehicle 6 is not presumably proceeding in fords, static water floods and/or off-road, both sealing lips 30, 31 detach from the radial 26 and axial 25 portions of the support ring 16 assuming the detaching configuration shown in FIG. 5. In such a condition, any particles of dust and/or mud and any splashes of water are already expelled by centrifugal effect from the rim of the motorized wheel 2. After examining the characteristics of the seal assembly 1 according to the present invention, the advantages that it allows to obtain are evident.

In particular, the fact that the sealing lips 30, 31 ensure contact with the support ring 16 for speeds of the motorized wheel 2 higher than the value V, but detach from the support ring 16 itself for speeds higher than the aforesaid value V, makes it possible to obtain an excellent compromise between the protection of the electric motor 3 from external contaminants and the energy efficiency of the motorized wheel 1.

At low speeds, i.e. at speeds wherein the vehicle 6 could potentially proceed through fords, flooded/muddy areas and/or off-road, there will be a greater elastic load of the sealing lips 30, 31 on the support ring 16 so as to ensure greater protection of the compartment 15 housing the electric motor 3; at such speeds, despite the high friction between the sealing lips 30, 31 and the support ring 16, the power dissipated would still be reduced precisely because of the low speed; and At high speeds, i.e. at speeds wherein the possible exposure to external contaminants is lower and any dust and/or mud particles are already expelled by centrifugal effect from the rim of the motorized wheel 2, there will be less protection but also the cancellation of the power dissipated by friction; furthermore, in such a condition, the separation between the sealing lips 30, 31 and the support ring 16 does not generate either wear or overheating and results not only in an optimization of the energy efficiency of the motorized wheel 1 but also in a long service life of the seal assembly 1.

Finally, it is clear that changes and variations can be made to the described and shown seal assembly 1 without departing from the scope of protection of the claims.

The invention claimed is:

1. A seal assembly configured to prevent/limit the entry of external contaminants into a motor compartment of a motorized wheel for vehicles, said motor compartment being designed to house an electric motor, said sealing assembly having a central axis and comprising:
   a first support ring made of a rigid material, fixable to a fixed stator part of the motorized wheel;
   a second support ring of rigid material, rotatable in use about said axis with respect to the first support ring and jointly with a rotor portion of the motorized wheel coupled to the stator portion; and
   an annular gasket made of elastically deformable material, interposed between said first and second support rings and including an anchor portion, attached to said second support ring, and at least a first and a second annular sealing lip, protruding cantilevered from said anchor portion;
   wherein the first support ring includes a first axial portion, extending parallel to said axis and attachable to the stator portion of the motorized wheel, and a first radial portion, extending radially with respect to said axis; and
   wherein the second support ring comprises a second axial portion, extending parallel to said axis in a position facing the first axial portion and fixable to the rotor portion of the motorized wheel, and a second radial portion, extending radially with respect to said axis in a position facing the first radial portion;

wherein the second axial portion of the second support ring is placed radially outermost of the first axial portion of the first support ring;

wherein the anchor portion of the gasket is fixed to the second radial portion of the second support ring;

wherein the first and second annular sealing lips are mounted by interference between the first and second support rings and define a sealing configuration, in which they cooperate with contact with the first radial portion and with the first axial portion of the first support ring, respectively, along respective annular contact lines so as to be elastically preloaded, without the aid of external actions or external components, against the first support ring itself; and wherein the first and second annular sealing lips are set by centrifugal effect in a detaching configuration from the first radial portion and the first axial portion of the first support ring, respectively, at speeds of the motorized wheel greater than a predetermined non-zero value.

2. The seal assembly according to claim 1, wherein the first and second radial portions are interposed between the first and second axial portions.

3. The seal assembly according to claim 1, wherein the first annular sealing lip has an intermediate fold between the anchor portion of the gasket and a free end cooperating in contact in use with the first radial portion of the first support ring in the sealing configuration.

4. The seal assembly according to claim 3, wherein the first annular sealing lip comprises a base portion extending between the anchor portion of the seal and said intermediate fold, and an oblique portion extending between said intermediate fold and said free end; and wherein said oblique portion of said first annular sealing lip forms an acute angle with the first radial portion of said first support ring on a side facing said first axial portion.

5. The seal assembly according to claim 4, wherein said base portion of said first annular sealing lip is substantially parallel to said axis.

6. The seal assembly according to claim 1, wherein said first annular sealing lip has a tapered section towards a free end thereof.

7. The seal assembly according to claim 1, wherein the second annular sealing lip extends from the anchor portion of the gasket, at a position radially interposed between the first annular sealing lip and the first axial portion of the first support ring, and is bounded, on a side facing said first radial portion of said first support ring, by a truncated conical surface with respect to said axis, having diameters decreasing towards the first radial portion of said first support ring.

8. The seal assembly according to claim 1, wherein the first annular sealing lip has, in an undeformed configuration and prior to assembly in the seal assembly, an overall axial length, starting from the anchor portion of the gasket, between 110% and 130% of an axial distance between said first and second radial portions of said first and second support rings when installed.

9. The seal assembly according to claim 1, wherein the anchor portion of the gasket is attached to a free end portion of the second radial portion of said second support ring.

10. The seal assembly according to claim 9, wherein the second annular sealing lip has, in an undeformed configuration and prior to assembly in the seal assembly, an overall radial length from the anchor portion of the gasket, between 110% and 130% of the radial distance between the free end portion of the second radial portion of the second support ring and the first axial portion of the first support ring when installed.

11. The seal assembly according to claim 7, further comprising a third annular lip, having a truncated conical shape with a conicity opposite to a conicity of said truncated conical surface of said second annular sealing lip and extending towards said first axial portion of the first support ring from said anchor portion; said third annular lip delimiting with said first axial portion of the first support ring an annular opening having such a small size as to allow the passage of air while defining a stop for particulate impurities.

* * * * *